(12) United States Patent
Ueyama

(10) Patent No.: US 6,674,486 B2
(45) Date of Patent: Jan. 6, 2004

(54) SIGNAL PROCESSOR AND SIGNAL PROCESSING METHOD

(75) Inventor: Akihiro Ueyama, Tokyo (JP)

(73) Assignee: Sony Corporation (JP)

(*) Notice: Subject to any disclaimer, the term of this patent is extended or adjusted under 35 U.S.C. 154(b) by 412 days.

(21) Appl. No.: 09/863,698

(22) Filed: May 23, 2001

(65) Prior Publication Data

US 2001/0048485 A1 Dec. 6, 2001

(30) Foreign Application Priority Data

May 31, 2000 (JP) ................................ P2000-163176
Jun. 8, 2000 (JP) ................................ P2000-172336

(51) Int. Cl.$^7$ ................................................ H04N 5/21
(52) U.S. Cl. .................... 348/627; 348/625; 348/607
(58) Field of Search .......................... 348/606, 607, 348/623, 624, 614, 625, 627, 630, 631, 241, 252, 253; 375/254, 285; 382/254, 260, 275; 386/76, 114; 455/63.1, 67.13, 114.2; H04N 5/21, 5/213

(56) References Cited

U.S. PATENT DOCUMENTS

| | | | | |
|---|---|---|---|---|
| 4,249,209 A | * | 2/1981 | Storey | 348/620 |
| 4,991,184 A | * | 2/1991 | Hashimoto | 375/285 |
| 5,343,253 A | * | 8/1994 | Nishi | 348/614 |
| 6,408,189 B1 | * | 6/2002 | Nakamura et al. | 455/67.16 |

FOREIGN PATENT DOCUMENTS

JP 08098058 * 4/1996

* cited by examiner

Primary Examiner—Sherrie Hsia
(74) Attorney, Agent, or Firm—Lerner, David, Littenberg, Krumholz & Mentlik, LLP (57) ABSTRACT

A video signal processor includes a sharpening circuit, a non-correlation detecting circuit, and, optionally, a noise level detecting circuit. The sharpening circuit is capable of receiving an input luminance signal. The sharpening circuit has a transversal filter. The transversal filter is operable to filter the input luminance signal to produce an intermediate signal and to produce a filtered luminance signal with a time lag. The sharpening circuit is operable to multiply the filtered luminance signal by a predetermined factor, to adjust the time lag to produce a resultant luminance signal, and to add the resultant luminance signal to the intermediate signal. The non-correlation detecting circuit detects noise or fluctuation in the intermediate signal. The non-correlation detecting circuit is operable to set the predetermined factor to a selected value based upon the presence of at least one of the noise or the fluctuation in the intermediate signal, according to a threshold voltage. The noise level detecting circuit detects a noise level. The threshold voltage is varied depending upon the noise level. When the intermediate signal is detected to contain the noise but not the fluctuation, the sharpening circuit cancels at least a portion of the noise. Thus, the video signal processor discriminates a low-level signal from a large-amplitude noise, and reduces noise contained in a video signal.

12 Claims, 10 Drawing Sheets

SIGNAL PROCESSOR AND SIGNAL PROCESSING METHOD

BACKGROUND OF THE INVENTION

The present invention relates to a video signal processor to which a sharpening circuit is preferably adapted in order to improve the sharpness of a picture, and a video signal processing method implemented in the video signal processor.

A sharpening circuit is a known means that has the ability to improve sharpness when adapted to a television receiver, a video tape player, or a digital video disk player.

A noise reducing circuit for the conventional television receiver includes a circuit that improves sharpness to make a noise indiscernible. Specifically, the circuit detects a noise level, adjusts a sharpness level in inverse proportion to the detected noise level, and increases a gain to be given to a relatively high-frequency signal component.

However, as far as the foregoing conventional noise reducing circuit is concerned, if a signal contains a noise, a sharpening circuit may intensify the noise. This may lead to deterioration of image quality. For this reason, another method adopts a circuit that detects a noise level, adjusts a sharpness level in inverse proportion to the detected noise level, and thus makes a noise indiscernible. In this case, the signal-to-noise ratio of a video signal cannot be improved directly. Moreover, there is a drawback that if a noise is present, sharpness cannot be improved but deteriorates.

The sharpening function includes a core ring sharpening technology that sharpens only a signal whose level is equal to or larger than a certain level but does not sharpen small-amplitude signals including a noise. However, the core ring sharpening technology has a drawback that a noise contained in a video signal cannot be eliminated.

SUMMARY OF THE INVENTION

Accordingly, an object of the present invention is to provide a video signal processor that successfully reduces the level of a noise contained in a video signal, and a video signal processing method implemented in the video signal processor.

A video signal processor in accordance with the present invention includes a sharpening circuit and a non-correlation detecting circuit. The sharpening circuit is capable of receiving an input luminance signal. The sharpening circuit has a transversal filter. The transversal filter is operable to filter the input luminance signal to produce an intermediate signal and to produce a filtered luminance signal having a time lag. The sharpening circuit is operable to multiply the filtered luminance signal by a predetermined factor to produce a weighted signal including the time lag, to adjust the time lag to produce a resultant luminance signal, and to add the resultant luminance signal to the intermediate signal. The non-correlation detecting circuit detects noise or fluctuation in the intermediate signal. The non-correlation detecting circuit is operable to set the predetermined factor to a selected value based upon the presence of at least one of the noise or the fluctuation in the intermediate signal. When the intermediate signal is detected by the non-correlation detecting circuit to contain the noise but not the fluctuation, the sharpening circuit performs noise canceling to subtract at least a portion of the noise from the resultant luminance signal.

A video signal processing method in accordance with the present invention includes sharpening and non-correlation detection. During sharpening, a transversal filter is used to filter an input luminance signal to produce an intermediate signal and to produce a filtered luminance signal having a time lag. The filtered luminance signal is multiplied by a predetermined factor to produce a weighted signal including the time lag. The time lag is adjusted to produce a resultant luminance signal. The resultant luminance signal is added to the intermediate signal. Non-correlation detection is performed on the intermediate signal to detect noise or fluctuation. The predetermined factor is set to a selected value based upon the presence of at least one of the noise or the fluctuation in the intermediate signal. When the intermediate signal is detected to contain the noise but not the fluctuation, noise canceling is performed to subtract at least a portion of the noise from the resultant luminance signal.

Moreover, a video signal processor in accordance with the present invention includes a sharpening circuit, a non-correlation detecting circuit, and a noise level detecting circuit. The sharpening circuit is capable of receiving an input luminance signal. The sharpening circuit has a transversal filter. The transversal filter is operable to filter the input luminance signal to produce an intermediate signal and to produce a filtered luminance signal having a time lag. The sharpening circuit is operable to multiply the filtered luminance signal by a predetermined factor to produce a weighted signal including the time lag, to adjust the time lag to produce a resultant luminance signal, and to add the resultant luminance signal to the intermediate signal. The non-correlation detecting circuit detects noise or fluctuation in the intermediate signal according to a threshold voltage. The non-correlation detecting circuit is operable to set the predetermined factor to a selected value based upon the presence of at least one of the noise or the fluctuation in the intermediate signal. The noise level detecting circuit detects a noise level. The threshold voltage is varied depending upon the noise level. When the intermediate signal is detected to contain the noise but not the fluctuation, the sharpening circuit performs noise canceling to subtract at least a portion of the noise from the resultant luminance signal.

Moreover, a video signal processing method in accordance with the present invention includes sharpening, non-correlation detection, and noise level detection. During sharpening, a transversal filter is used to filter an input luminance signal to produce an intermediate signal and to produce a filtered luminance signal having a time lag. The filtered luminance signal is multiplied by a predetermined factor to produce a weighted signal including the time lag. The time lag is adjusted to produce a resultant luminance signal. The resultant luminance signal is added to the intermediate signal. Non-correlation detection is performed on the intermediate signal to detect noise or fluctuation, according to a threshold voltage. The predetermined factor is set to a selected value based upon the presence of at least one of the noise or the fluctuation in the intermediate signal. During noise level detection, a noise level is detected. The threshold voltage is varied depending upon the noise level. When the intermediate signal is detected to contain the noise but not the fluctuation, noise canceling is performed to subtract at least a portion of the noise from the resultant luminance signal.

Accordingly, the present invention exerts the operation described below.

According to the present invention, in a video signal processor and a video signal processing method, non-correlation detection is performed in order to detect noise or fluctuation in an intermediate signal. When the intermediate signal contains the noise but not the fluctuation, noise canceling is performed in order to subtract out at least a portion of the noise.

According to the present invention, a signal containing noise has its sharpness improved through sharpening without deterioration of image quality while having the noise canceled.

Furthermore, according to the present invention, in a video signal processor and a video signal processing method, non-correlation detection is performed in order to detect noise or fluctuation in an intermediate signal. When the intermediate signal contains noise, noise canceling is performed in order to subtract out at least a portion of the noise. A signal is discriminated from noise based on a threshold voltage. The threshold voltage is varied depending on a detected noise level. Noise is subtracted from the luminance signal portion that contains noise based on the detected noise level.

According to the present invention, even when the level of noise varies largely, when noise is canceled, sharpness is improved without deteriorating image quality.

BRIEF DESCRIPTION OF THE DRAWINGS

FIG. 6A to FIG. 6F are timing charts indicating actions performed by a subtraction type noise reducing circuit;

FIG. 12A to FIG. 12C show the waveforms of signals for explaining actions performed by a synchronizing separator circuit and a sampling signal generator included in the noise level detecting circuit;

DETAILED DESCRIPTION

A video signal processor in accordance with a first embodiment of the present invention detects a correlation, subtracts a noise from a received signal to thus reduce the noise, and adds a sharpness component to the signal to thus improve sharpness.

The video signal processor in accordance with the first embodiment of the present invention is adapted to a television receiver in which a sharpening circuit is incorporated. The television receiver receives a telecast, reduces a noise of a video signal contained in the received telecast, sharpens the video signal that has the noise thereof reduced, and displays a picture on a display means.

The video signal processor is not limited to the television receiver in which the sharpening circuit is incorporated. The video signal processor may be adapted to a television receiver that reduces a noise of a video signal sent from an external or built-in video signal source (video reproducing apparatus), sharpens the resultant video signal, and displays a picture according to the video signal.

Figure 1:
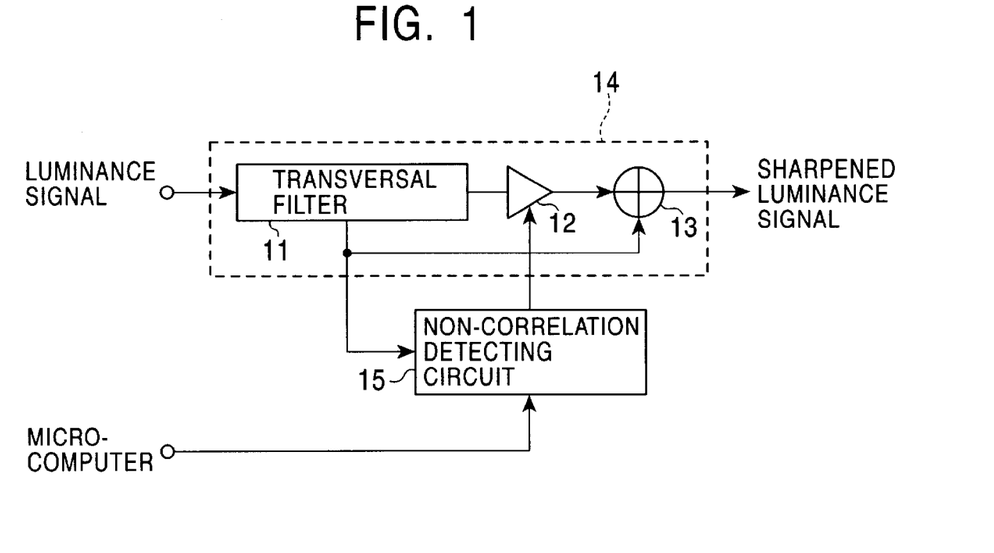
FIG. 1 is a block diagram of the circuitry of a sharpening circuit adapted to a video signal processor in accordance with a first embodiment.

The circuitry of the sharpening circuit adapted to the video signal processor in accordance with the first embodiment of the present invention will be described below. FIG. 1 shows the circuitry of a sharpening circuit adapted to the video signal processor in accordance with the first embodiment of the present invention. A luminance signal is sent to the sharpening circuit. The luminance signal is separated from a video signal sent to a television receiver (video signal sent from an internal tuner or sent externally) by means of a luminance/chrominance separator circuit. Alternatively, the luminance signal is a luminance signal separated from a chrominance signal included in a video signal and sent from an external video signal source.

A portion 14 of the video signal processor in accordance with the first embodiment of the present invention, which is encircled with a dashed line in FIG. 1, is the same as a conventional sharpening circuit. A luminance signal is sent to a transversal filter 11. The transversal filter 11 produces a sharpness component that is weighted by a variable gain amplifier 12. The weighted signal is added to the intermediate luminance signal by an adder circuit 13. At this time, a weighting factor is determined with, for example, user-specified data entered at a microcomputer. The variable gain amplifier 12 uses the weighting factor to perform signal amplification.

If a received luminance signal contains noise, a non-correlation detecting circuit 15 discriminates a portion of the luminance signal containing only the noise from a portion thereof containing the noise and exhibiting a fluctuation. When a received luminance signal portion contains only noise, the non-correlation detecting circuit 15 transfers a negative weighting factor to the variable gain amplifier 12. Consequently, noise canceling is performed to subtract the noise from the luminance signal.

Figure 2:
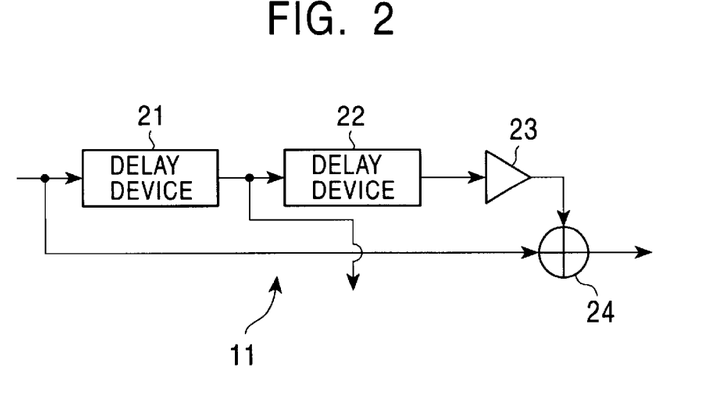
FIG. 2 is a circuit diagram showing an example of circuitry of a transversal filter included in the sharpening circuit.

FIG. 2 shows a practical example of the circuitry of the transversal filter 11 of FIG. 1. A signal is delayed by delay devices 21 and 22, and is then multiplied by a predetermined gain by an amplifier 23. An intermediate signal is formed by the delay device 21. An adder 24 adds the signal output from the amplifier 23 and the received luminance signal to produce a sharpness component.

Figure 3:
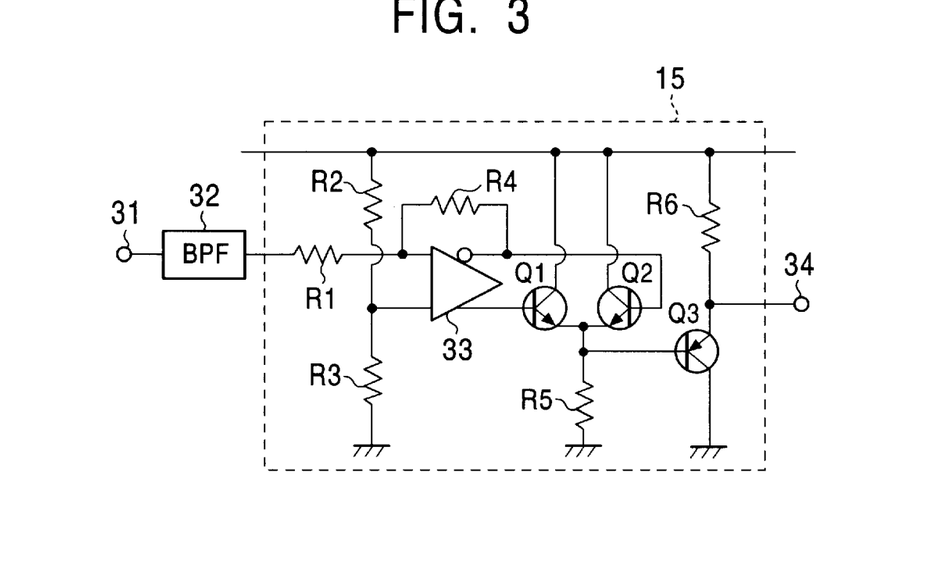
FIG. 3 is a circuit diagram showing an example of circuitry of a non-correlation detecting circuit included in the sharpening circuit.

FIG. 3 shows a practical example of the circuitry of the non-correlation detecting circuit 15 shown in FIG. 1. A signal applied to an input terminal 31 and passed through a bandpass filter (BPF) 32 (having the same characteristic as the transversal filter 11 shown in FIG. 1) is applied to one of input terminals of a differential amplifier 33 via a resistor R1. A signal that is a fraction of a supply voltage produced by resistors R2 and R3 is applied to the other input terminal of the differential amplifier 33. A resistor R4 is connected to one input terminal of the differential amplifier 33 and to a first output terminal thereof. An inverted output signal, whose polarity is the opposite of an input polarity, is transmitted by the first output terminal. The differential amplifier 33 and resistors R1 to R4 act as a comparator. In this case, the threshold voltage of the comparator is determined with a ratio of a fraction of the supply voltage produced by the resistor R2 to a fraction thereof produced by the resistor R3. A voltage representing a factor entered at the microcomputer (shown in FIG. 1) is applied to a node between the resistors R2 and R3.

A non-inverted output signal of the differential amplifier 33 is applied to the base of a transistor Q1. The non-inverted output signal has the same polarity as the input polarity. The inverted output signal of the differential amplifier 33 is applied to the base of a transistor Q2. The transistors Q1 and Q2 have emitters thereof connected to each other, whereby an emitter follower is constructed. The emitter follower detects an absolute value of an output of the differential amplifier 33. A resistor R5 is connected between the emitters of the transistors Q1 and Q2 and a ground. A node between the transistors Q1 and Q2 and the resistor R5 is connected to the base of a transistor Q3. A resistor R6 links the emitter of the transistor Q3 and a supply voltage line. A non-correlation detection signal output terminal 34 is led out from a node between the transistor Q3 and resistor R6.

Figure 4:
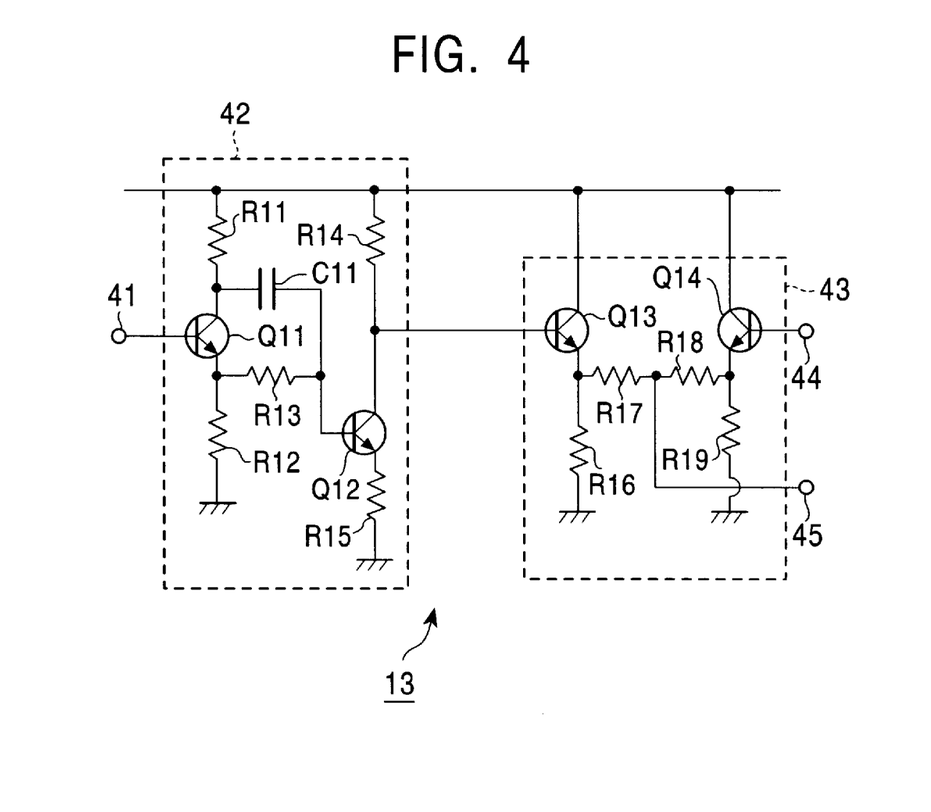
FIG. 4 is a circuit diagram showing an example of circuitry of an equalizer and adder included in the sharpening circuit.

FIG. 4 shows a practical example of the circuitry of the adder circuit 13 shown in FIG. 1. The adder circuit 13 shown in FIG. 4 consists mainly of an equalizer 42 and an adder 43. The equalizer 42 adjusts a delay. A luminance signal applied to the input terminal 41 of the equalizer 42 is applied to the base of a transistor Q11. A resistor R11 is connected between the collector of the transistor Q11 and the supply voltage line. A resistor R12 is connected between the emitter of the transistor Q11 and the ground. One terminal of a resistor R13 is connected to the emitter of the transistor Q11. One terminal of a capacitor C11 is connected to the collector of the transistor Q11. The other terminal of the resistor R13 and the other terminal of the capacitor C11 are connected to the base of a transistor Q12. A resistor R14 is connected between the transistor Q12 and the supply voltage line. A resistor R15 is connected between the emitter of the transistor Q12 and the ground. An output of the equalizer 42 is led out from a node between the transistor Q12 and resistor R14.

The transistor Q11 in the equalizer 42 serves as a delay circuit, and can adjust a minute difference of a delay time by adjusting a time constant of a capacitor-resistor circuit composed of the capacitor C11 and resistor R13. The transistor Q12 inverts an input signal and adjusts a gain to be given to the signal. An output signal of the transistor Q12 is transmitted as an output signal of the equalizer 42.

The output signal of the equalizer 42 is applied to the base of a transistor Q13 of the adder 43. The adder 43 consists of two transistors Q13 and Q14, and resistors R16, R17, R18, and R19. Another addition signal sent from the transversal filter 11 is applied to the base of the transistor Q14 through an input terminal 44. The resistor R16 is connected between the emitter of the transistor Q13 and the ground. The resistor R19 is connected between the emitter of the transistor Q14 and the ground. A series circuit composed of the resistors R17 and R18 is connected between the emitters of the transistor Q13 and Q14. An addition signal output terminal 45 is led out from a node between the resistors R17 and R18.

Figure 5:
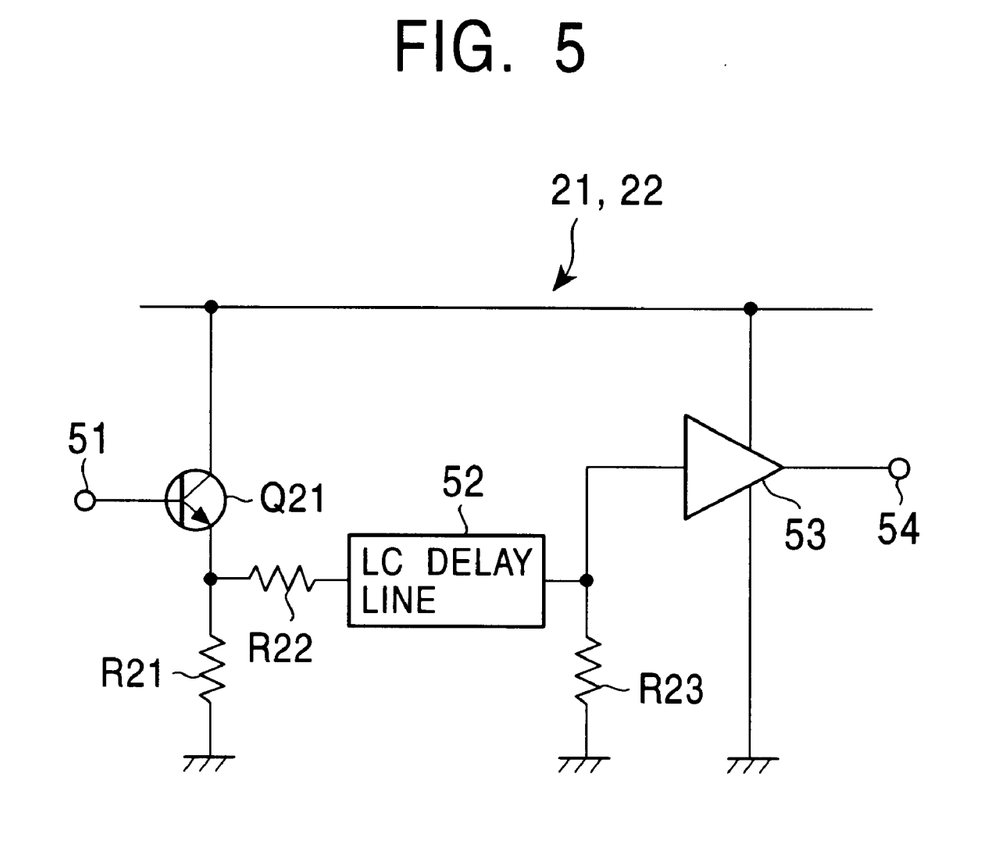
FIG. 5 is a circuit diagram showing an example of circuitry of a delay device included in the transversal filter.

FIG. 5 shows an example of circuitry for adjusting the timings of the delay devices 21 and 22 shown in FIG. 2. A signal applied to an input terminal 51 is applied to the base of a transistor Q21. A resistor R21 is connected between the emitter of the transistor Q21 and the ground. A node between the transistor Q21 and resistor R21 is connected to the input terminal of an amplifier 53 via a resistor R22 and an LC delay line 52. An output of the amplifier 53 is applied to an output terminal 54 of the delay device. The input terminal of the amplifier 53 is grounded via a resistor R23.

Since the delay devices 21 and 22 have the circuitry shown in FIG. 5, a termination resistor is connected to the LC delay line 52. A signal passed through the LC delay line 52 decays to have the level thereof halved. For compensating the decay, the amplifier 53 in the delay device shown in FIG. 5 performs amplification.

Figure 6A:
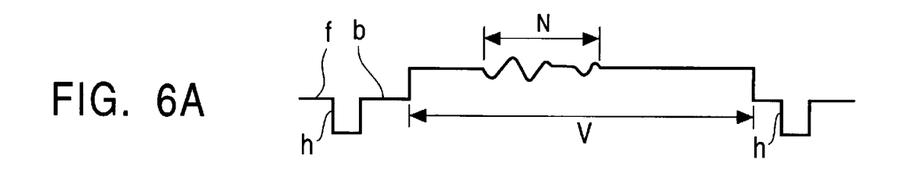
FIG. 6A shows a received luminance signal.

Next, actions to be performed in the subtraction type noise reducing sharpening circuit adapted to the video signal processor in accordance with the first embodiment of the present invention will be described with reference to the timing charts of FIGS. 6A–F. Actions to be performed for sharpening are identical to those to be performed by a conventional sharpening circuit, and the description of the sharpening actions will be omitted. FIG. 6A shows an example of a change in the level of a luminance signal sent to the subtraction type noise reducing sharpening circuit. The luminance signal contains a horizontal sync signal h that develops in certain cycles. The portions of the luminance signal preceding and succeeding the horizontal sync signal h are referred to as a front porch f and a back porch b, respectively. The front porch f and back porch b have a constant level. Video information V has a level proportional to a luminance level. Herein, assume that a noise N is superimposed on part of the video information V (the noise N is shown enhanced in the drawing).

The luminance signal is applied to the bandpass filter 32, which is installed in the input stage of the non-correlation detecting circuit 15. When the luminance signal has only a high-frequency component thereof passed through the bandpass filter 32, the luminance signal becomes a differential wave shown in FIG. 6B. The high-frequency component wave exhibits a fluctuation on borders between the horizontal sync signal and the front porch f and back porch b, and borders between the video information V and the front porch f and back porch b. Moreover, the noise N appears.

Figure 6B:
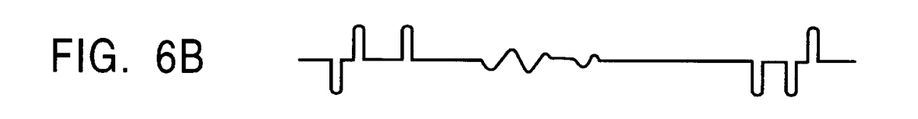
FIG. 6B shows a differential wave of the luminance signal.
Figure 6C:
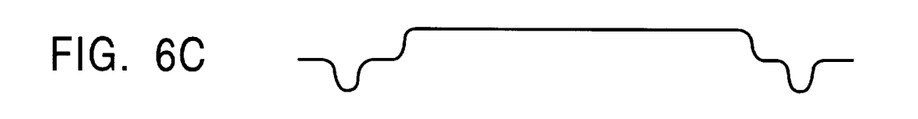
FIG. 6C shows a subtracted signal of the differential wave of the luminance signal.

Assuming that the signal shown in FIG. 6B is subtracted from the signal shown in FIG. 6A, the noises N are canceled as shown in FIG. 6C. However, the leading and trailing edges of the horizontal sync signal are devoid of a high-frequency component. The signal shown in FIG. 6C is therefore unsuitable for a video signal. In the present embodiment, the non-correlation detecting circuit 15 is included in order to detect a non-correlation of the signal. Subtraction of the signal is controlled based on the result of detection. What is referred to as a non-correlation refers to the leading or trailing edge of a flat portion (a portion of the luminance signal whose level is constant) or any other fluctuation occurring during horizontal scanning.

Figure 6D:
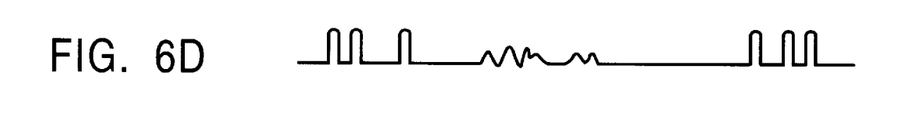
FIG. 6D shows an absolute value signal of the differential wave.
Figure 6E:
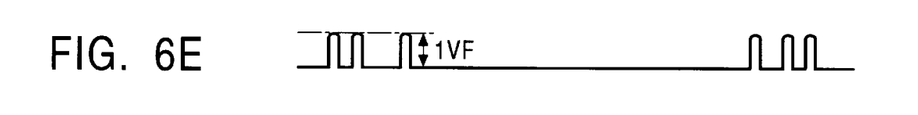
FIG. 6E shows a signal having a noise subtracted based on a threshold voltage (1 VF) or less.

Specifically, the high-frequency component wave shown in FIG. 6B is rectified to produce a wave shown in FIG. 6D. The signal level of the wave may be, as shown in FIG. 6E, lower than a threshold voltage (1 VF). When the level of a received luminance signal portion is lower than the threshold voltage, a negative factor is set in the weighting circuit, that is, the variable gain amplifier 12. The weighted luminance signal portion is subtracted from an original luminance signal portion and the succeeding luminance signal portion is treated by the adder circuit 13. The noises N can therefore be subtracted. Consequently, the adder circuit 13 adds a sharpness component to the portions of a luminance signal that exhibits a fluctuation and has no correlation, that is, the borders between the horizontal sync signal and the front porch f and back porch b, and the borders between the video information V and the front porch f and back porch b. The portion of the luminance signal that exhibits no fluctuation but has a correlation has the noise N subtracted therefrom.

Figure 6F:
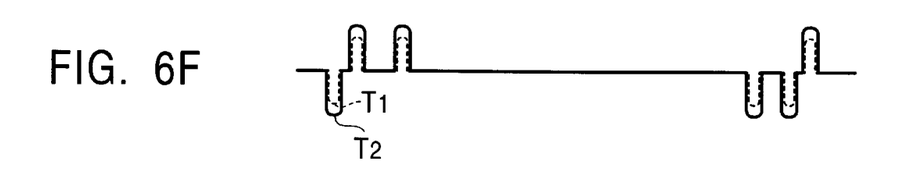
FIG. 6F shows a differential wave adaptable to a low threshold voltage or a high threshold voltage.

FIG. 6F shows a wave which is drawn with a dashed line and for which the threshold voltage can be set to a lower voltage T1, and a wave which is drawn with a solid line and for which the threshold voltage can be set to a high voltage T2. The adder circuit 13 adds a sharpness component to the portions of the luminance signal that exhibit a fluctuation but have no correlation, that is, the borders between the horizontal sync signal and the front porch f and back porch b, and the borders between the video information V and the front porch f and back porch b. The portion of the luminance signal that exhibits no fluctuation and has a correlation has the noise N thereof subtracted based on the low threshold voltage T1 indicated with the dashed line or the high threshold voltage T2 indicated with the solid line.

Figure 7:
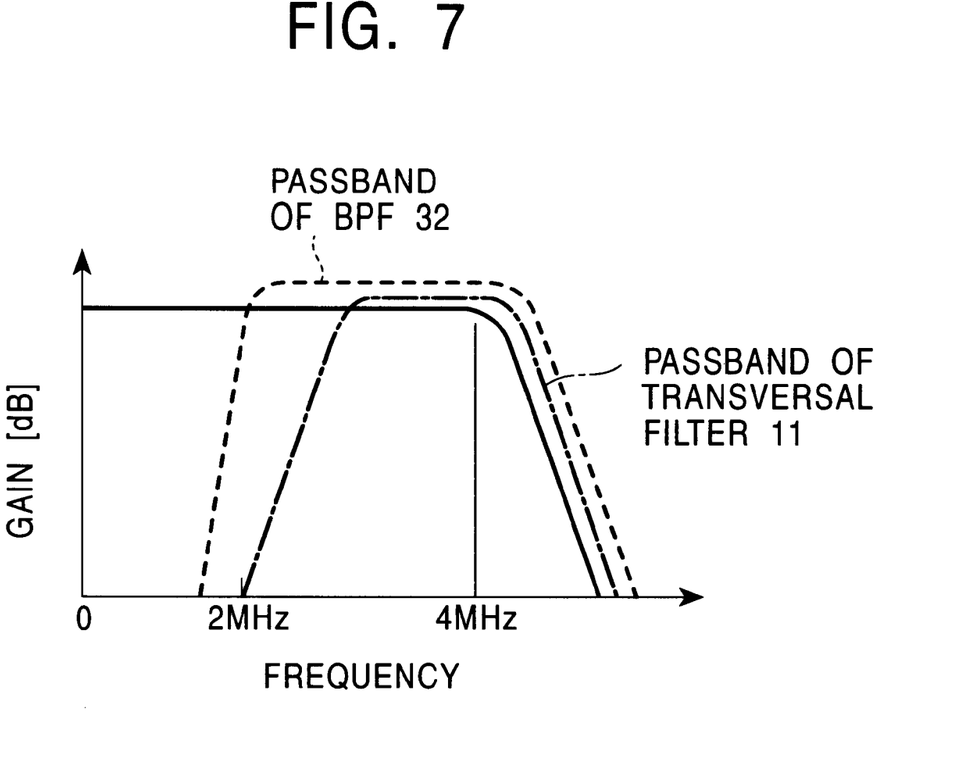
FIG. 7 shows examples of the frequency band of the luminance signal and the passband of the transversal filter.

FIG. 7 shows examples of the frequency band of a luminance signal to be treated by the noise reducing sharpening circuit (adaptable to the video signal processor in accordance with the present embodiment), and the passband of the transversal filter 11. The axis of abscissas indicates frequency, and the axis of ordinates indicates gain to be given to a signal. When the frequency of a luminance signal sent to the sharpening circuit employed in the present embodiment is approximately 4 MHz, the passband of the transversal filter 11 is set to, for example, 2 MHz or higher. The bandpass filter 32 used to detect a correlation shall have a property of passing frequencies higher than a frequency slightly lower than the lower limit of the passband of the transversal filter 11. The passband of the bandpass filter 32 is made wider than that of the transversal filter 11. This is intended to reliably detect a non-correlation of a signal (a fluctuation of a luminance signal) over a wider frequency band.

Figure 8:
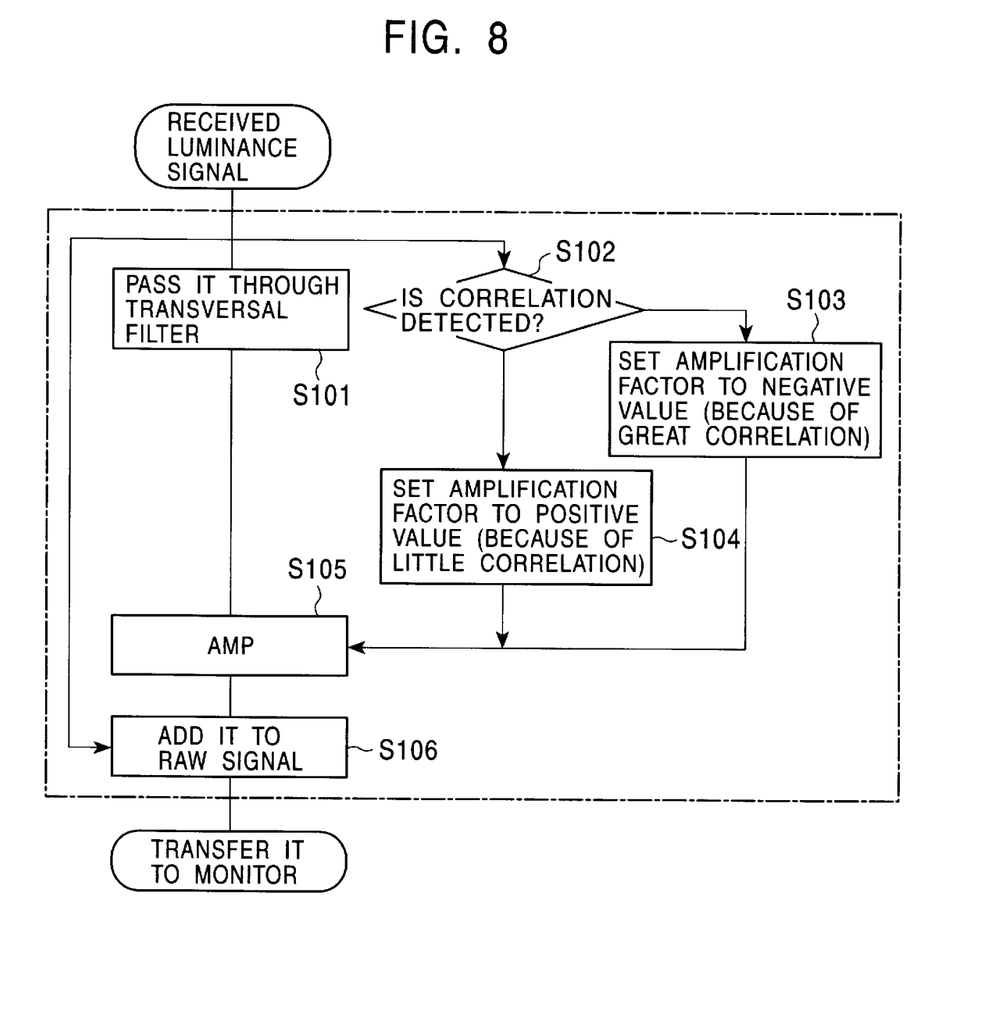
FIG. 8 is a flowchart describing a sharpening process according to the present invention.

Next, noise reduction performed by the noise reducing sharpening circuit adaptable to the video signal processor in accordance with the present embodiment will be described with reference to the flowchart of FIG. 8. Referring to FIG. 8, when a luminance signal is received, the transversal filter 11 limits the luminance signal to a predetermined frequency band at step S101. Concurrently, a non-correlation is detected at step S102. It is judged at step S102 of non-correlation detection whether a (great) correlation is detected. If a great correlation is detected, it is judged at step S103 that the luminance signal is greatly affected by a noise. An amplification factor or a weighting factor is set to a negative value at step S103 because of the great correlation. The negative value is passed to the variable gain amplifier 12 (FIG. 1) at step S105. At an addition step S106, noise subtraction is executed.

It is judged at the non-correlation detection step S102 whether a non-correlation (little correlation) is detected. If a little correlation is detected, it is judged at step S104 that the luminance signal is slightly affected by a noise. At step S104, the amplification factor, that is, the weighting factor, is set to a positive value because of the little correlation. The positive value is passed to the variable gain amplifier 12 at step S105. At the addition step S106, the high-frequency component of the luminance signal is added to an optical luminance signal for enhancement in order to thus improve sharpness.

The sharpening circuit adaptable to the video signal processor in accordance with the present embodiment includes a correlation detecting circuit capable of detecting a signal and a noise. A sharpness component can be reduced but will not be added to the noise that deteriorates image quality.

Moreover, in the video signal processor of the present embodiment, the microcomputer of FIG. 1 is used to enter a noise reduction rate. The noise reduction rate can therefore be changed to any value. The core ring sharpening technology may therefore be implemented in the video signal processor.

When the video signal processor of the present embodiment is used to reduce a noise contained in a received video signal, a white noise deriving from a feeble electric field can be reduced successfully.

Next, a description will be made of a video signal processor in accordance with the second embodiment of the present invention.

Figure 9:
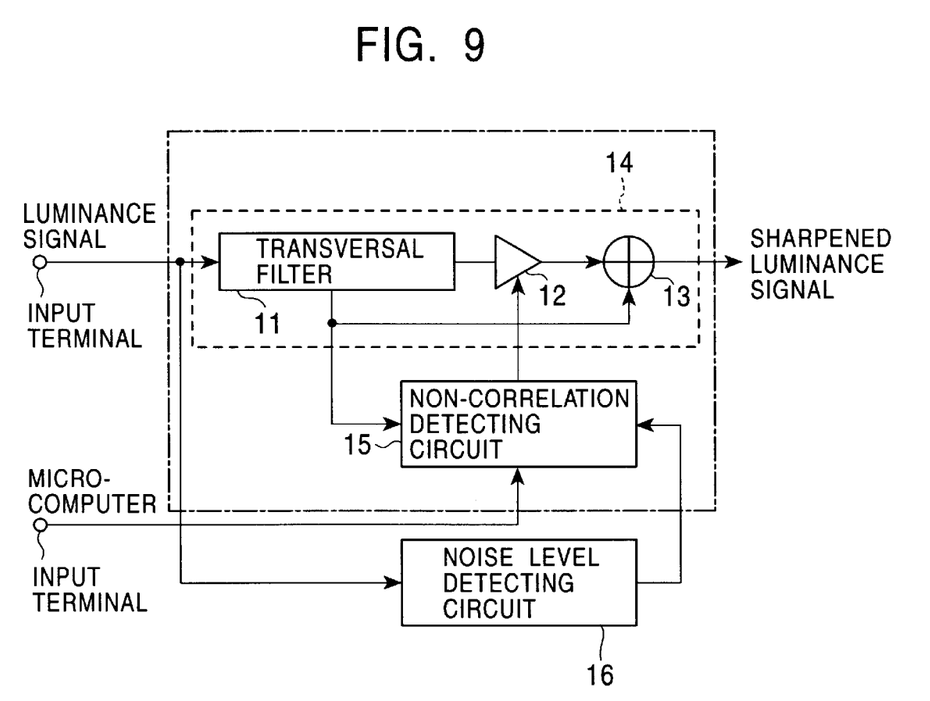
FIG. 9 is a block diagram showing the circuitry of a sharpening circuit adapted to a video signal processor in accordance with a second embodiment.

FIG. 9 shows the circuitry of a noise reducing sharpening circuit adaptable to the video signal processor in accordance with the second embodiment of the present invention. The present embodiment is different from the first embodiment in that a reference level for non-correlation detection can be adjusted based on a noise level and that a luminance signal enjoying a good signal-to-noise ratio is not subjected to noise cancellation.

A noise level detected by a noise level detecting circuit 16, shown in FIG. 9, is communicated to the non-correlation detecting circuit 15. The noise level detecting circuit 16 detects a noise level. The non-correlation detecting circuit detects a non-correlation based on a threshold voltage. The threshold voltage is based on the noise level. Consequently, the non-correlation detecting circuit 15 varies the threshold voltage depending on the noise level, and causes the sharpening circuit to reduce a noise.

Figure 10:
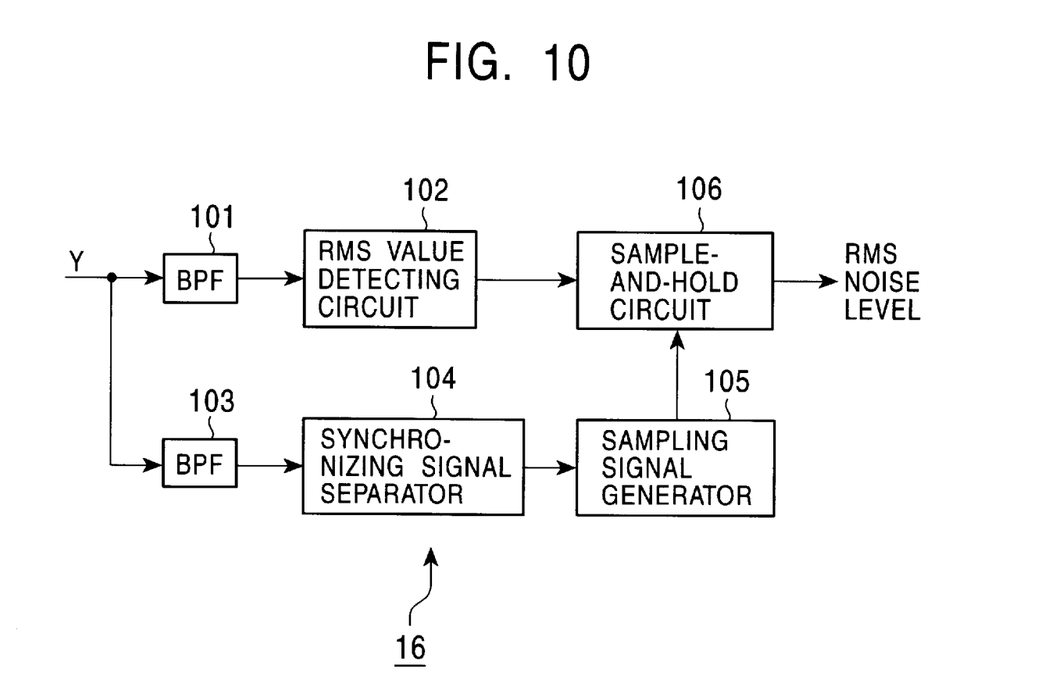
FIG. 10 is a circuit diagram showing an example of circuitry of a noise level detecting circuit.

FIG. 10 is a block diagram for explaining the noise level detecting circuit 16 shown in FIG. 9. As shown in FIG. 10, the noise level detecting circuit 16 consists of bandpass filters (BPFs) 101 and 103, an rms value detecting circuit 102, a synchronizing signal separator 104, a sampling signal generator 105, and a sample-and-hold circuit 106.

The BPF 101 is used to fetch a mixed noise from a luminance signal Y. Specifically, the BPF 101 limits a signal to be sent to the rms value detecting circuit 102 to the frequencies of a noise. The noise fetched when the BPF 101 limits the luminance signal Y to the frequency band of the noise is transferred to the rms value detecting circuit 102.

Figure 11:
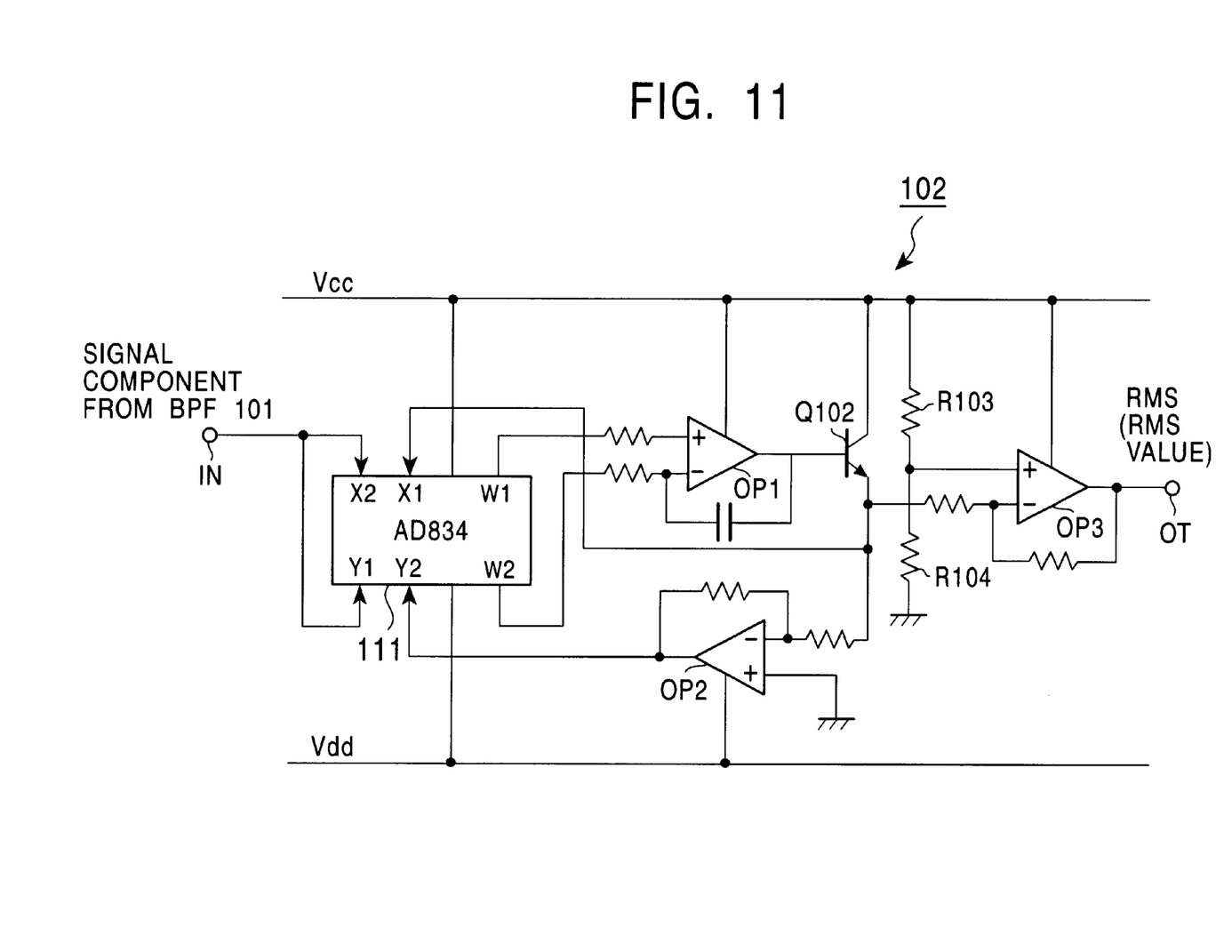
FIG. 11 is a circuit diagram illustrating an exemplary rms value-of-noise detecting circuit.

The rms value detecting circuit 102 detects a root-mean-square (rms) value of a received signal, and communicates the rms value in the form of a direct voltage. FIG. 11 is a circuit diagram for explaining an example of the circuitry of the rms value-of-noise detecting circuit 102. As shown in FIG. 11, the rms value-of-noise detecting circuit 102 consists mainly of a multiplier 111 and three operational amplifiers OP1, OP2, and OP3.

A signal component fetched by the BPF 101 is applied to input terminals X2 and Y1 of the multiplier 111. Output signals of the multiplier 111 are transferred to the operational amplifier OP1 through output terminals W1 and w2. An output signal of the operational amplifier OP1 is applied to an input terminal X1 of the multiplier 111, and sent to the operational amplifier OP2. Operational amplifier OP2 is an inverting amplifier. An output signal of the operational amplifier OP2, having a polarity opposite to the polarity of the input signal, is applied to an input terminal Y2 of the multiplier 111.

A signal having a polarity opposite to the polarity of an output signal transferred from the multiplier 111 through the output terminal W2 is applied to the input terminal Y2 of the multiplier 111. A signal having a polarity the same as the polarity of the output signal sent from the multiplier 111 through the output terminal W1 is applied to the input terminal X1 of the multiplier 111.

Consequently, an output of a circuit composed of the multiplier 111 and operational amplifiers OP1 and 0P2 is balanced when an output of the operational amplifier OP1 is zero, and calculated according to formula (1) described below.

$$(Vin-Vout) \times (Vin+Vout) \quad (1)$$

In other words, the output of the circuit composed of the multiplier 11 and operational amplifiers OP1 and OP2 is provided as formula (2) below.

$$Vout = \sqrt{(|Vin^2|)} \quad (2)$$

When a sine-wave signal is sent to the rms value-of-noise detecting circuit shown in FIG. 11, a rms value of the input signal is detected as a direct voltage component at the emitter of the transistor Q102. An output signal of the transistor Q102 has the polarity thereof reversed by the operational amplifier OP3, and has the direct voltage component thereof adjusted by resistors R103 and R104. The adjusted direct voltage component, that is, the rms value of the signal sent to the rms value-of-noise detecting circuit shown in FIG. 11 is transferred to the sample-and-hold circuit 106 shown in FIG. 10 through an output terminal OT.

Returning to FIG. 10, the BPF 103 receives the luminance signal Y, passes a predetermined frequency component of the luminance signal Y, and transfers the predetermined frequency component to the synchronizing signal separator 104. The synchronizing signal separator 104 separates a vertical sync signal from the received signal, and transfers the vertical sync signal to the sampling signal generator 105.

The sampling signal generator 105 produces a sampling signal with the vertical sync signal as a reference signal. The sampling signal represents the portion of the luminance signal having neither a video signal nor a control signal superimposed thereon FIGS. 12A–C show the waveforms of signals for explaining the actions of the synchronizing signal separator 104 and sampling signal generator 105.

Figure 12:
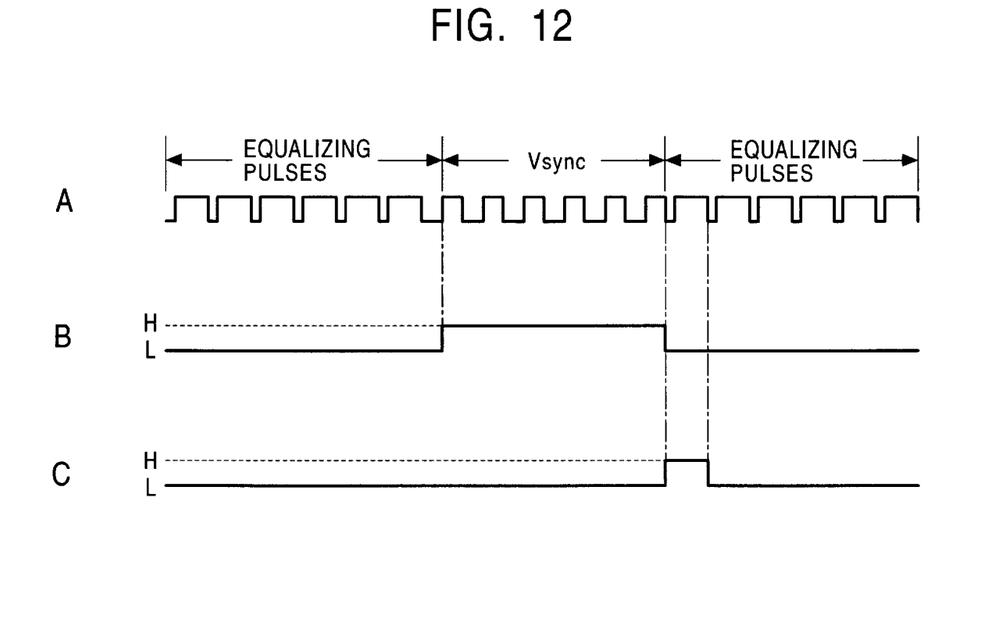
FIG. 12A shows timing pulses preceding and succeeding a vertical sync signal contained in a luminance signal sent to the synchronizing separator circuit.
FIG. 12B shows one horizontal scanning period (1H) that starts at the leading edge of the vertical sync signal.
FIG. 12C shows a period during which a sampling signal is high (H)

FIG. 12A shows timing pulses preceding and succeeding the vertical sync signal contained in the luminance signal sent to the synchronizing signal separator 104. The synchronizing signal separator 104 separates the vertical sync signal (Vsync) as shown in FIG. 12A. The vertical sync signal shown in FIG. 12A is transferred to the sampling signal generator 105.

The sampling signal generator 105 uses the vertical sync signal sent from the synchronizing signal separator 104 as a reference signal and produces a sampling signal. The sampling signal goes, as shown in FIG. 12C, high at the trailing edge of the vertical sync signal shown in FIG. 12B and remains high during one horizontal scanning period (1H). During the other period, the sampling signal is low.

Figure 13:
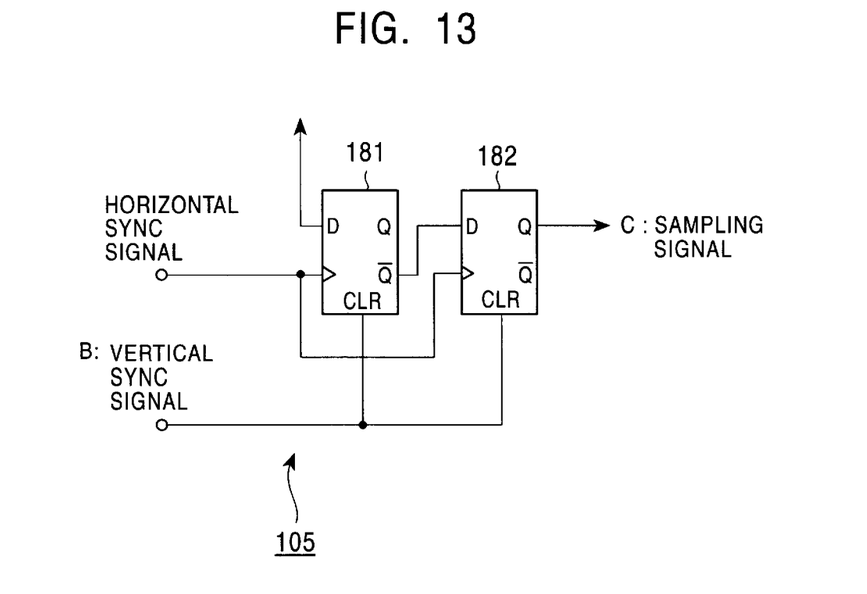
FIG. 13 is a circuit diagram showing an example of circuitry of a sampling signal generator.

The sampling signal generator 105 is realized with, for example, a D flip-flop circuit. A signal of a high logic level into which the vertical sync signal is converted as shown in FIG. 12B is, as shown in FIG. 13, applied to the clear input terminals CLR of D flip-flop circuits 181 and 182. A signal of a high logic level into which a horizontal sync signal is converted is applied to the clock terminals > of the D flip-flop circuits 181 and 182. The active low output terminal ($\overline{Q}$) (where $\overline{Q}$ means active low) of the D flip-flop circuit 181 is connected to the data input terminal (D) of the D flip-flop circuit 182. Consequently, the sampling signal shown in FIG. 12C is provided as an active high output signal (Q) of the D flip-flop circuit 182.

The sampling signal produced by the sampling signal generator 105 as shown in FIG. 12C is transferred to the sample-and-hold circuit 106. When the sampling signal produced by the sampling signal generator 105 is high, the sample-and-hold circuit 106 samples a signal.

In the foregoing present embodiment, a period during which the sampling signal is high as shown in FIG. 12C is one horizontal scanning period. One horizontal scanning period is the duration of an equalizing pulse immediately succeeding the vertical sync signal as shown in FIG. 12A. During the period, neither a video signal nor a control signal is superposed on the luminance signal.

When the sampling signal produced by the sampling signal generator is high, the sample-and-hold circuit 106 samples the rms value detected by the rms value detecting circuit 102. Consequently, the rms value (which may be referred to as a noise level) of the portion of the luminance signal that contains only a noise but does not contain any intelligence signal (such as a video signal or a control signal) can be detected accurately. The noise level is communicated from the noise level detecting circuit 16 to the non-correlation detecting circuit 15.

In the second embodiment, the passband of the BPF 101 is the same as that of the BPF 103. Needless to say, the passbands of the BPFs 101 and 103 may be different from each other.

When the video signal processor in accordance with the second embodiment of the present invention is used to reduce a noise contained in a received video signal, a white noise derived from the presence of a weak electric field can be reduced successfully.

A video signal processor in accordance with the present invention comprises a sharpening circuit and a non-correlation detecting circuit. The sharpening circuit is capable of receiving an input luminance signal and has a transversal filter. The transversal filter is operable to filter the input luminance signal to produce an intermediate signal and to produce a filtered luminance signal having a time lag. The sharpening circuit is operable to multiply the filtered luminance signal by a predetermined factor to produce a weighted signal including the time lag, adjust the time lag to produce a resultant luminance signal, and to add the resultant luminance signal to the intermediate signal. The non-correlation detecting circuit detects noise or fluctuation in the intermediate signal. The non-correlation detecting circuit is operable to set the predetermined factor to a selected value based upon the presence of at least one of the noise or the fluctuation in the intermediate signal. When the intermediate signal is detected by the non-correlation detecting circuit to contain the noise but not the fluctuation, the sharpening circuit performs noise canceling to subtract at least a portion of the noise from the resultant luminance signal portion. Consequently, owing to the sharpening circuit, despite the simple circuitry, the video signal processor can successfully cancel noises contained in a video signal.

In the video signal processor in accordance with the first embodiment of the present invention, when the non-correlation detecting circuit judges that the intermediate signal has no correlation but contains only the noise, the non-correlation detecting circuit sets the predetermined factor to a negative value. When the intermediate signal exhibits no fluctuation but contains only the noise, sharpening is suspended and noise reduction is performed in order to cancel the noise. Consequently, noises can be reduced effectively over a broad frequency band.

Moreover, in the video signal processor in accordance with the first embodiment of the present invention, when the non-correlation detecting circuit judges that the intermediate signal has a correlation, contains the noise, and exhibits the fluctuation, the predetermined factor is set to a positive value. When the intermediate signal exhibits a large fluctuation, the high-frequency component of the intermediate signal is added to the resultant luminance signal for enhancement. Consequently, sharpness can be improved by performing ordinary sharpening.

A video signal processing method in accordance with the present invention comprises sharpening and non-correlation detection. During sharpening, a transversal filter is used to filter an input luminance signal to produce an intermediate signal and to produce a filtered luminance signal having a time lag. The filtered luminance signal is multiplied by a predetermined factor to produce a weighted signal including the time lag. The time lag is adjusted to produce a resultant luminance signal. The resultant luminance signal is added to the intermediate signal. Non-correlation detection is performed on the intermediate signal to detect noise or fluctuation. The predetermined factor is set to a selected value based upon the presence of at least one of the noise or the fluctuation in the intermediate signal. When the intermediate signal is detected to contain the noise but not the fluctuation, noise canceling is performed to subtract the noise from the luminance signal portion during the sharpening. Owing to the sharpening, despite the simple processing, the video signal processing method can successfully cancel noises contained in a video signal.

Moreover, in the video signal processing method in accordance with the first embodiment of the present invention, when it is judged that the intermediate signal has no correlation but contains only the noise, the predetermined factor is set to a negative value. When the intermediate signal exhibits no fluctuation but contains only the noise, sharpening is suspended and noise reduction is performed in order to cancel the noise. Noises can therefore be effectively reduced over a broad frequency band.

Moreover, in the video signal processing method in accordance with the first embodiment of the present invention, when it is judged that the intermediate signal has a correlation, contains the noise, and exhibits the fluctuation, the predetermined factor is set to a positive value. When the intermediate signal exhibits a large fluctuation, the high-frequency component of the intermediate signal is added to the resultant luminance signal for enhancement. Consequently, sharpness can be improved through ordinary sharpening.

Moreover, a video signal processor in accordance with the present invention comprises a sharpening circuit, a non-correlation detecting circuit, and a noise level detecting circuit. The sharpening circuit is capable of receiving an input luminance signal. The sharpening circuit has a transversal filter. The transversal filter is operable to filter the input luminance signal to product an intermediate signal and to produce a filtered luminance signal having a time lag. The sharpening circuit is operable to multiply the filtered luminance signal by a predetermined factor to produce a weighted signal including the time lag, adjust the time lag to produce a resultant luminance signal, and to add the resultant luminance signal to the intermediate signal. The non-correlation detecting circuit detects noise or fluctuation in the intermediate signal according to a threshold voltage. The non-correlation detecting circuit is operable to set the predetermined factor to a selected value based upon the presence of at least one of the noise or the fluctuation in the intermediate signal. The noise level detecting circuit detects a noise level. The threshold voltage is varied depending upon the noise level. When the intermediate signal is detected to contain the noise but not the fluctuation, the sharpening circuit performs noise canceling to subtract at least a portion of the noise from the resultant luminance signal. Owing to the sharpening circuit, despite the simple circuitry, even if the noise level varies, since the noise level detecting circuit can detect the noise level, the video signal processor can successfully cancel noises which are contained in a video signal and which range from a small-amplitude noise to large-amplitude noise.

Moreover, in the video signal processor in accordance with the second embodiment of the present invention, the threshold voltage is dependent on a pre-set noise level. When non-correlation detection is performed continuously, noise reduction can be achieved all the time. Moreover, the luminance signal will not be deteriorated.

Moreover, in the video signal processor in accordance with the second embodiment of the present invention, the threshold voltage is varied depending on specifications. Therefore, noise reduction can be achieved based on specifications.

Moreover, a video signal processing method in accordance with the present invention comprises sharpening, non-correlation detection, and noise level detection. During sharpening, a transversal filter is used to filter an input luminance signal to produce an intermediate signal and to produce a filtered luminance signal having a time lag. The filtered luminance signal is multiplied by a predetermined factor to produce a weighted signal including the time lag. The time lag is adjusted to produce a resultant luminance signal. The resultant luminance signal is added to the intermediate signal. Non-correlation detection is performed on the intermediate signal to detect noise or fluctuation, according to a threshold voltage. The predetermined factor is set to a selected value based upon the presence of at least one of the noise or the fluctuation in the intermediate signal. During noise level detection, a noise level is detected. The threshold voltage is varied depending upon the noise level. When the intermediate signal is detected to contain the noise but not the fluctuation, noise reduction is performed to subtract at least a portion of the noise from the resultant luminance signal. Owing to the sharpening, despite the simple processing, even if the noise level is varied, the noise level can be detected during the noise level detection. Consequently, the video signal processing method can successfully cancel noise which is contained in a video signal and which ranges from small-amplitude noise to large-amplitude noise.

Moreover, in the video signal processing method in accordance with the second embodiment of the present invention, the threshold voltage is dependent on a pre-set noise level. Therefore, when non-correlation detection is performed continuously, noise reduction can be achieved all the time. The luminance signal will not be deteriorated.

Moreover, in the video signal processing method in accordance with the second embodiment of the present invention, during the non-correlation detection, the threshold voltage is varied depending on specifications. Consequently, noise reduction can be achieved based on specifications.

What is claimed is:

1. A video signal processor, comprising:
   a sharpening circuit capable of receiving an input luminance signal, the sharpening circuit having a transversal filter, the transversal filter being operable to filter the input luminance signal to produce an intermediate signal and to produce a filtered luminance signal having a time lag, the sharpening circuit being operable to multiply the filtered luminance signal by a predetermined factor to produce a weighted signal including the time lag, to adjust the time lag to produce a resultant luminance signal, and to add the resultant luminance signal to the intermediate signal; and
   a non-correlation detecting circuit for detecting noise or fluctuation in the intermediate signal, the non-correlation detecting circuit being operable to set the predetermined factor to a selected value based upon the presence of at least one of the noise or the fluctuation in the intermediate signal,
   wherein, when the intermediate signal is detected by said non-correlation detecting circuit to contain the noise but not the fluctuation, said sharpening circuit performs noise canceling to subtract at least a portion of the noise from the resultant luminance signal.

2. A video signal processor according to claim 1, wherein, if said non-correlation detecting circuit judges that the intermediate signal has no correlation but contains only the noise, said non-correlation detecting circuit sets the predetermined factor to a negative value.

3. A video signal processor according to claim 1, wherein if said non-correlation detecting circuit judges that the intermediate signal has a correlation, contains the noise, and exhibits the fluctuation, said non-correlation detecting circuit sets the predetermined factor to a positive value.

4. A video signal processing method, comprising:
   filtering an input luminance signal using a transversal filter to produce an intermediate signal and to produce a filtered luminance signal having a time lag;
   multiplying the filtered luminance signal by a predetermined factor to produce a weighted signal including the time lag;
   adjusting the time lag to produce a resultant luminance signal;
   adding the resultant luminance signal to the intermediate signal;
   detecting noise or fluctuation in the intermediate signal;
   setting the predetermined factor to a selected value based upon the presence of at least one of the noise or the fluctuation in the intermediate signal; and
   when the intermediate signal is detected to contain the noise but not the fluctuation, performing noise canceling to subtract at least a portion of the noise from the resultant luminance signal.

5. A video signal processing method according to claim 4, wherein, if it is judged that the intermediate signal has no correlation but contains only the noise, the predetermined factor is set to a negative value.

6. A video signal processing method according to claim 4, wherein, if it is judged that the intermediate signal has a correlation, contains the noise, and exhibits the fluctuation, the predetermined factor is set to a positive value.

7. A video signal processor, comprising:
   a sharpening circuit capable of receiving an input luminance signal, the sharpening circuit having a transversal filter, the transversal filter being operable to filter the input luminance signal to produce an intermediate signal and to produce a filtered luminance signal having a time lag, the sharpening circuit being operable to multiply the filtered luminance signal by a predetermined factor to produce a weighted signal including the time lag, to adjust the time lag to produce a resultant luminance signal, and to add the resultant luminance signal to the intermediate signal;
   a non-correlation detecting circuit for detecting noise or fluctuation in the intermediate signal according to a threshold voltage, the non-correlation detecting circuit being operable to set the predetermined factor to a selected value based upon the presence of at least one of the noise or the fluctuation in the intermediate signal; and
   a noise level detecting circuit for detecting a noise level, the threshold voltage being varied depending upon the noise level;
   wherein, when the intermediate signal is detected by said non-correlation detecting circuit to contain the noise but not the fluctuation, said sharpening circuit performs noise canceling to subtract at least a portion of the noise from the resultant luminance signal.

8. A video signal processor according to claim 7, wherein the threshold voltage is dependent on a pre-set noise level.

9. A video signal processor according to claim 7, wherein the threshold voltage is varied depending on specifications.

10. A video signal processing method, comprising:
    filtering an input luminance signal using a transversal filter to produce an intermediate signal and to produce a filtered luminance signal having a time lag; multiplying the filtered luminance signal by a predetermined factor to produce a weighted signal including the time lag;
    adjusting the time lag to produce a resultant luminance signal;
    adding the resultant luminance signal to the intermediate signal;
    detecting noise or fluctuation in the intermediate signal according to a threshold voltage;
    setting the predetermined factor to a selected value based upon the presence of at least one of the noise or the fluctuation in the intermediate signal;
    detecting a noise level;
    varying the threshold voltage depending on the noise level; and
    when the intermediate signal is detected to contain the noise but not the fluctuation, performing noise canceling to subtract at least a portion of the noise from the resultant luminance signal.

11. A video signal processing method according to claim 10, wherein the threshold voltage is dependent on a pre-set noise level.

12. A video signal processing method according to claim 10, wherein the threshold voltage is varied depending on specifications.

* * * * *